United States Patent
Hu et al.

(10) Patent No.: US 10,589,496 B2
(45) Date of Patent: *Mar. 17, 2020

(54) MULTILAYERED POLYOLEFIN FILMS, METHODS OF MANUFACTURE THEREOF AND ARTICLES COMPRISING THE SAME

(71) Applicant: Dow Global Technologies LLC, Midland, MI (US)

(72) Inventors: Yushan Hu, Pearland, TX (US); Rajen M. Patel, Lake Jackson, TX (US); Gary R. Marchand, Gonzales, LA (US); Sharon L. Baker, Lake Jackson, TX (US); Christopher I. Gandy, Chicago, IL (US); Lori L. Kardos, Sugar Land, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/359,654

(22) Filed: Nov. 23, 2016

(65) Prior Publication Data

US 2017/0072667 A1    Mar. 16, 2017

Related U.S. Application Data

(62) Division of application No. 14/183,954, filed on Feb. 19, 2014.

(51) Int. Cl.
*B32B 27/32* (2006.01)
*B29C 49/04* (2006.01)
(Continued)

(52) U.S. Cl.
CPC .............. *B32B 27/32* (2013.01); *B29C 48/21* (2019.02); *B29C 48/22* (2019.02); *B29C 49/02* (2013.01);
(Continued)

(58) Field of Classification Search
None
See application file for complete search history.

(56) References Cited

U.S. PATENT DOCUMENTS

| 3,645,992 A | 2/1972 | Elston |
| 3,914,342 A | 10/1975 | Mitchell |

(Continued)

FOREIGN PATENT DOCUMENTS

| EP | 1318173 A1 | 6/2003 |
| JP | H05281665 A | 10/1993 |

(Continued)

OTHER PUBLICATIONS

US 5,693,387 A, 12/1997, Rosenbaum (withdrawn)
(Continued)

*Primary Examiner* — Catherine S Branch
(74) *Attorney, Agent, or Firm* — Cantor Colburn LLP

(57) ABSTRACT

Disclosed herein is a multilayer film comprising two outer layers; where each outer layer comprises polyethylene; two tie layers; where each tie layer comprises a crystalline block composite; where each tie layer has a first face and a second face that are opposed to each other, and where the first face of each tie layer contacts at least one outer layer; and a core layer; where the core layer comprises a polypropylene; where the second face of each tie layer contacts the core layer. Disclosed herein is a method that includes coextruding the aforementioned multilayered film.

13 Claims, 2 Drawing Sheets

(51) Int. Cl.

| | | |
|---|---|---|
| B29C 47/06 | (2006.01) | |
| B32B 7/12 | (2006.01) | |
| B32B 27/08 | (2006.01) | |
| B29C 48/21 | (2019.01) | |
| B29C 48/22 | (2019.01) | |
| B29C 49/02 | (2006.01) | |
| B29K 23/00 | (2006.01) | |
| B29L 9/00 | (2006.01) | |
| B29L 31/00 | (2006.01) | |

(52) U.S. Cl.
CPC .............. *B29C 49/04* (2013.01); *B32B 7/12* (2013.01); *B32B 27/08* (2013.01); *B29K 2023/06* (2013.01); *B29K 2023/12* (2013.01); *B29K 2995/0077* (2013.01); *B29L 2009/00* (2013.01); *B29L 2031/7128* (2013.01); *B32B 2250/05* (2013.01); *B32B 2250/242* (2013.01); *B32B 2250/40* (2013.01); *B32B 2270/00* (2013.01); *B32B 2274/00* (2013.01); *B32B 2307/54* (2013.01); *B32B 2307/546* (2013.01); *B32B 2307/558* (2013.01); *B32B 2307/704* (2013.01); *B32B 2323/04* (2013.01); *B32B 2323/10* (2013.01); *B32B 2439/00* (2013.01); *B32B 2439/46* (2013.01); *B32B 2439/70* (2013.01); *Y10T 428/31913* (2015.04)

(56) References Cited

U.S. PATENT DOCUMENTS

| | | | |
|---|---|---|---|
| 4,076,698 | A | 2/1978 | Anderson et al. |
| 4,144,113 | A | 3/1979 | Mori et al. |
| 4,429,079 | A | 1/1984 | Shibata et al. |
| 4,599,392 | A | 7/1986 | McKinney et al. |
| 5,272,236 | A | 12/1993 | Lai et al. |
| 5,278,272 | A | 1/1994 | Lai et al. |
| 5,324,800 | A | 6/1994 | Welborn, Jr. et al. |
| 5,328,760 | A | 7/1994 | Gillberg-Laforce |
| 5,504,172 | A | 4/1996 | Imuta et al. |
| 5,582,923 | A | 12/1996 | Kale et al. |
| 5,733,155 | A | 3/1998 | Sagawa |
| 5,783,638 | A | 7/1998 | Lai et al. |
| 5,854,045 | A | 12/1998 | Fang et al. |
| 5,972,443 | A | 10/1999 | Breck et al. |
| 5,993,949 | A | 11/1999 | Rosenbaum |
| 6,254,944 | B1 | 7/2001 | Robert et al. |
| 6,525,157 | B2 | 2/2003 | Cozewith et al. |
| 6,727,000 | B2 | 4/2004 | Joly |
| 6,946,203 | B1 | 9/2005 | Lockhart |
| 6,960,635 | B2 | 11/2005 | Stevens et al. |
| 7,199,203 | B2 | 4/2007 | Stevens et al. |
| 7,335,424 | B2 | 2/2008 | Domine et al. |
| 7,405,008 | B2 | 7/2008 | Domine et al. |
| 8,106,139 | B2 | 1/2012 | Marchand et al. |
| 8,119,235 | B1 | 2/2012 | Vogel et al. |
| 8,802,774 | B2 | 8/2014 | Carnahan |
| 8,916,249 | B2 | 12/2014 | Liang |
| 2002/0182391 | A1 | 12/2002 | Migliorini et al. |
| 2004/0009360 | A1 | 1/2004 | Longo et al. |
| 2004/0013890 | A1 | 1/2004 | Kovalchuk et al. |
| 2004/0121172 | A1 | 6/2004 | Hofmann |
| 2006/0057410 | A1 | 3/2006 | Saavedra |
| 2007/0004860 | A1 | 1/2007 | Leboeuf |
| 2007/0275219 | A1 | 11/2007 | Patel et al. |
| 2011/0082249 | A1 | 4/2011 | Shan et al. |
| 2011/0082257 | A1 | 4/2011 | Carnahan et al. |
| 2011/0082258 | A1 | 4/2011 | Walton et al. |
| 2011/0313106 | A1 | 12/2011 | Shan et al. |
| 2011/0313107 | A1 | 12/2011 | Shan et al. |
| 2011/0313108 | A1 | 12/2011 | Shan et al. |
| 2012/0060997 | A1 | 3/2012 | Mitchell et al. |
| 2012/0111407 | A1 | 5/2012 | Rummens |
| 2013/0011669 | A1 | 1/2013 | Lu et al. |
| 2013/0095335 | A1 | 4/2013 | Hermel-Davidock |
| 2013/0177720 | A1 | 7/2013 | Liang |
| 2013/0303680 | A1 | 11/2013 | Weaver et al. |
| 2015/0231861 | A1 | 8/2015 | Hu et al. |
| 2016/0325534 | A1 | 11/2016 | Hu et al. |
| 2017/0008253 | A1 | 1/2017 | Su et al. |
| 2017/0008263 | A1 | 1/2017 | Hu et al. |

FOREIGN PATENT DOCUMENTS

| | | | |
|---|---|---|---|
| JP | H10265751 A | 10/1998 | |
| JP | 2000094604 A | 4/2000 | |
| JP | 2001059028 A | 3/2001 | |
| JP | 2001105551 A | 4/2001 | |
| JP | 2004167823 A | 6/2004 | |
| JP | 2004299393 A | 10/2004 | |
| JP | 2004307065 A | 11/2004 | |
| JP | 2007237641 A | 9/2007 | |
| JP | 2009143118 A | 7/2009 | |
| JP | 4953560 B2 | 6/2012 | |
| WO | 001745 A1 | 1/2000 | |
| WO | 0038843 A1 | 7/2000 | |
| WO | 2009015126 A1 | 1/2009 | |
| WO | 2009114797 A1 | 9/2009 | |
| WO | 2010008696 A1 | 2/2010 | |
| WO | 2010033276 A2 | 3/2010 | |
| WO | 2010115312 A1 | 10/2010 | |
| WO | 2011149886 A1 | 12/2011 | |
| WO | 2011163187 A1 | 12/2011 | |
| WO | 2011163191 A1 | 12/2011 | |
| WO | 2012044730 A1 | 4/2012 | |
| WO | 2012044732 A1 | 4/2012 | |
| WO | 2013003541 A1 | 1/2013 | |
| WO | 2013003543 A1 | 1/2013 | |
| WO | WO-2013090396 A1 * | 6/2013 | ............ C08F 287/00 |
| WO | 2014043522 A1 | 3/2014 | |

OTHER PUBLICATIONS

International Search Report for International Application No. PCT/US2014/071848; International Filing Date Dec. 22, 2014; dated Mar. 12, 2015 (4 pages).

International Search Report for International Application No. PCT/US2015/016536; International Filing Date Feb. 19, 2015; dated Apr. 29, 2015 (4 pages).

International Search Report for International Application No. PCT/US2015/016541; International Filing Date Feb. 19, 2015; dated Apr. 29, 2015 (4 pages).

International Search Report for International Application No. PCT/US2015/016607; International Filing Date Feb. 19, 2015; dated Jun. 16, 2015 (5 pages).

Internatioal Search Report for International Application No. PCT/US2015/016610; International Filing Date Feb. 19, 2015; dated Apr. 13, 2015 (5 pages).

International Search Report for International Application Serial No. PCT/CN2014/072260; International Filing Date Feb. 19, 2014; dated Oct. 10, 2014 (7 pages).

International Search Report for International Application Serial No. PCT/CN2014/072265; International Filing Date Feb. 19, 2014; dated Nov. 28, 2014 (8 pages).

John Dealy et al., "Rheometers for Molten Plastics" Published by Van Nostrand Reinhold Co. (1982) on pp. 97-99.

K.W. Dixon-J. Branderup, E. Immergut, E. Grulke, eds. "Decomposition Rates of Organic Free Radical Initiators" Polymer Handbook, 4th ed., Wiley, New York, 1999, Section II, pp. 1-76.

M. Shida et al. "Correlation of Low Density Polyethylene Rheological Measurments with Optical and Processing Properties" Polymer Engineering and Science, vol. 17, No. 11, p. 769-774 (1977).

Machine Translation of JP 2000-094604 (2000) 6 Pages.

Rosalind Juran, editor "Polypropylene" Modern Plastics Encyclopedia/89, mid Oct. 1988 Issue, vol. 65, No. 11, pp. 86-92.

Rudin, A., "Practical Aspects of Molecular Weight Measurements" Modern Methods of Polymer Characterization, John Wiley & Sons, New York (1991) pp. 103-112.

(56) References Cited

OTHER PUBLICATIONS

Written Opinion for International Application No. PCT/US2014/071848; International Filing Date Dec. 22, 2014; dated Mar. 12, 2015 (5 pages).
Written Opinion for International Application No. PCT/US2015/016536; International Filing Date Feb. 19, 2015; dated Apr. 29, 2015 (5 pages).
Written Opinion for International Application No. PCT/US2015/016541; International Filing Date Feb. 19, 2015; dated Apr. 29, 2015 (5 pages).
Written Opinion for International Application No. PCT/US2015/016607; International Filing Date Feb. 19, 2015; dated Jun. 16, 2015 (7 pages).
Written Opinion for International Application No. PCT/US2015/016610; International Filing Date Feb. 19, 2015; dated Apr. 13, 2015 (7 pages).
Written Opinion for International Application Serial No. PCT/CN2014/072260; International Filing Date Feb. 19, 2014; dated Oct. 10, 2014 (4 pages).
Written Opinion for International Application Serial No. PCT/CN2014/072265; International Filing Date Feb. 19, 2014; dated Nov. 28, 2014 (4 pages).
Zimm, G.H. and Stockmayer, W.H., J. "The Dimensions of Chain Molecules Containing Branches and Rings" Chem. Phys., 17, 1301 (1949).
Holden et al.(Translated by Fu, Zhifeng); "Thermoplastic Elastomer"; Chemistry Industry Press, 2000, p. 106—relevant portions translated.
Van Krevelen (Translated by Xu, Yuanze et al.); "Properties of Polymers: Their Estimation and Correlation with Chemical Structure"; Beijing Scientific Publishing Company; 1981; pp. 247-248—relevant portion translated.
Yu et al.; "Synthetic Resin and Plastic Performance Manual"; Beijing Mechanical Industry Publishing House; 2011, p. 64—relevant portion translated.
DOW; ATTANE SL 4102G Data Sheet; "Ultra Low Density Polyethylene Resin for Blown Films"; Technical Information—Blown Film Extrusion; 2 pages.
DOW; "Affinity PL 1880G, Polyolefin Plastomer";Technical Information; Jan. 11, 2012, 3 pages.

\* cited by examiner

MULTILAYERED POLYOLEFIN FILMS, METHODS OF MANUFACTURE THEREOF AND ARTICLES COMPRISING THE SAME

CROSS-REFERENCE TO RELATED APPLICATIONS

This application is a divisional application that claims priority to a U.S. Non-Provisional application having Ser. No. 14/183,954, filed on Feb. 19, 2014, the entire contents of which are hereby incorporated by reference.

BACKGROUND

This disclosure relates to multilayered polyolefin films, methods of manufacture thereof and to articles comprising the same.

Multilayered films are widely used as heavy duty shipping sacks for bagging bulk products such as chemicals, polymers, fertilizers and animal food. These multilayers are often polyethylene based, combining high density polyethylene (HDPE) as stiffening layer and metallocene linear low density polyethylene (LLDPE) sealant layer for sealability and toughness. Combinations of different type of polyethylenes layers and proper layer ratio selection offers desirable properties such as stiffness for mechanical strength and machineability (i.e., bag filling operation), toughness (good machine direction tear and dart drop) and sealability (good heat seal property). For polyethylene based multilayered films, incorporating more HDPE increases stiffness. However, the tear resistance in the machine direction (MD) is reduced. There therefore exists a need for improved high stiffness, high toughness multilayer films and heavy duty packaging in order to reduce the multilayered film thickness.

SUMMARY

Disclosed herein is a multilayer film comprising two outer layers; where each outer layer comprises polyethylene; two tie layers; where each tie layer comprises a crystalline block composite; where each tie layer has a first face and a second face that are opposed to each other, and where the first face of each tie layer contacts at least one outer layer; and a core layer; where the core layer comprises a polypropylene; where the second face of each tie layer contacts the core layer.

Disclosed herein is a method comprising coextruding a multilayered film comprising two outer layers; where each outer layer comprises polyethylene; two tie layers; where each tie layer comprises a crystalline block composite; where each tie layer has a first face and a second face that are opposed to each other, and where the first face of each tie layer contacts at least one outer layer; and a core layer; where the core layer comprises a polypropylene; where the second face of each tie layer contacts the core layer; and blowing the multilayered film.

DETAILED DESCRIPTION

Figure 1:
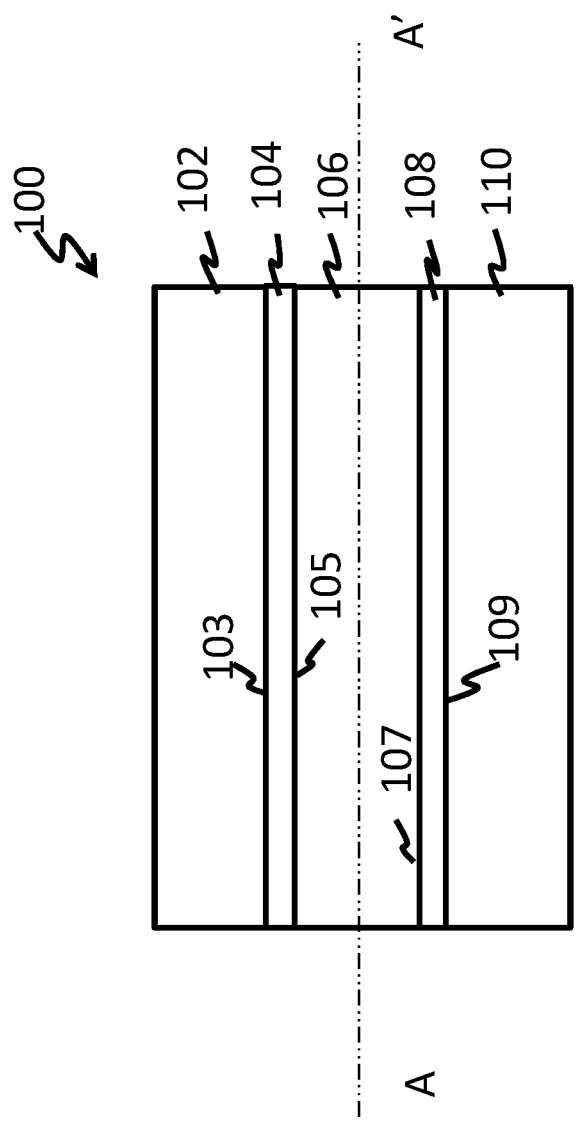
FIG. 1 depicts an exemplary embodiment of the multilayered film.

"Composition" and like terms mean a mixture of two or more materials, such as a polymer which is blended with other polymers or which contains additives, fillers, or the like. Included in compositions are pre-reaction, reaction and post-reaction mixtures the latter of which will include reaction products and by-products as well as unreacted components of the reaction mixture and decomposition products, if any, formed from the one or more components of the pre-reaction or reaction mixture.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

"Polymer" means a compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, etc. The terms "ethylene/α-olefin polymer" and "propylene/α-olefin polymer" are indicative of interpolymers as described below. It is noted that although a polymer is often referred to as being "made of" monomers, "based on" a specified monomer or monomer type, "containing" a specified monomer content, or the like, this is obviously understood to be referring to the polymerized remnant of the specified monomer and not to the unpolymerized species.

"Interpolymer" means a polymer prepared by the polymerization of at least two different monomers. This generic term includes copolymers, usually employed to refer to polymers prepared from two or more different monomers, and includes polymers prepared from more than two different monomers, e.g., terpolymers, tetrapolymers, etc.

"Polyolefin", "polyolefin polymer", "polyolefin resin" and like terms mean a polymer produced from a simple olefin (also called an alkene with the general formula $C_nH_{2n}$) as a monomer. Polyethylene is produced by polymerizing ethylene with or without one or more comonomers, polypropylene by polymerizing propylene with or without one or more comonomers, etc. Thus, polyolefins include interpolymers such as ethylene-α-olefin copolymers, propylene-α-olefin copolymers, etc.

"Melting Point" as used here (also referred to a melting peak in reference to the shape of the plotted DSC curve) is typically measured by the DSC (Differential Scanning Calorimetry) technique for measuring the melting points or peaks of polyolefins as described in U.S. Pat. No. 5,783,638. It should be noted that many blends comprising two or more polyolefins will have more than one melting point or peak; many individual polyolefins will comprise only one melting point or peak.

The term 'and/or' includes both "and" as well as "or". For example, the term A and/or B is construed to mean A, B or A and B.

Disclosed herein is a multilayered film that comprises a plurality of layers and that can be used as heavy duty shipping sacks for bagging a variety of different bulk products. The multilayer film comprises at least five layers—a first layer or an outer layer that comprises polyethylene, a second layer, which is a tie layer that comprises a crystalline block composite, a third layer (also called a core layer) that comprises polypropylene, a fourth layer, which is also a tie layer that comprises a crystalline block composite, and a fifth layer (also an outer layer that is opposedly disposed to the first layer) that comprises polyethylene. The presence of a core layer that comprises polypropylene in the multilayered film provides it with improved stiffness, high creep resistance, high temperature performance and oil/crease resistance, which enables the multilayered film to be used for bagging and shipping large masses of material or products. In another exemplary embodiment, the core layer has a thickness that is less than 20% of the thickness of the multilayered film.

FIG. 1 depicts the multilayered film 100 that comprises the first layer or outer layer 102, the second layer or tie layer 104, the third layer or core layer 106, the tie layer 108 and the fifth layer 110. In one embodiment, the multilayered film 100 has a symmetrical structure about a center line drawn through the length of the film. While the FIG. 1 depicts a single 5-layered multilayered film, commercial embodiments of the film can include multiples of the 5-layered multilayered film. For example, a single multilayered film can contain 2 or more 5-layered multilayered films that contact each other. In one embodiment, a single multilayered film can have 2 to 10 5-layered multilayered films, specifically 2 to 8 multilayered films, and more specifically 2 to 5 multilayered films that contact each other. In an exemplary embodiment, the plurality of multilayered films are coextruded. In another exemplary embodiment, the plurality of multilayered films are bonded together using an adhesive layer.

As may be seen in the FIG. 1, the first layer 102 and the fifth layer 110 are outer layers or skin layers that are disposed at opposing ends of the multilayered film and comprise a polyethylene. The following description will refer to the first layer 102 and the fifth layer 110 collectively as outer layers. The polyethylene is selected from ultralow density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultrahigh density polyethylene (UHDPE), and combinations thereof. In a further embodiment, the polyethylene has a density greater than 0.950 g/cc (i.e., a HDPE). The combinations can include blends, copolymers and blends of copolymers. In an exemplary embodiment, the polyethylene used in the outer layers is a linear low density polyethylene, an ethylene-α-olefin copolymer, or a combination thereof. When the outer layers comprise a linear low density polyethylene, an ethylene-α-olefin copolymer, or a combination thereof, they may also optionally contain a LDPE and/or HDPE.

In an exemplary embodiment, the outer layers 102 and 110 comprise linear low density polyethylene (LLDPE). LLDPE is a copolymer (also referred to as an interpolymer) of ethylene and an α-olefin having 3 to 12 carbon atoms, specifically 4 to 8 carbon atoms (e.g., propene, 1 butene, 4-methyl-1-pentene, 1-hexene, 1 octene, 1-decene, and the like), that has sufficient α-olefin content to reduce the density of the copolymer to that of LDPE. The term "LLDPE", includes both—resin manufactured using the traditional Ziegler-Nana catalyst systems as well as single-site catalysts such as metallocenes (sometimes referred to as "m-LLDPE"). LLDPEs contain less long chain branching than LDPEs and includes the substantially linear ethylene polymers which are further defined in U.S. Pat. Nos. 5,272, 236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the processes disclosed in U.S. Pat. No. 4,076, 698; and/or blends thereof (such as those disclosed in U.S. Pat. No. 3,914,342 or 5,854,045). The LLDPE can be made by any process such as gas phase polymerization, solution phase polymerization, slurry polymerization or combinations thereof.

In one embodiment, the LLDPE used in the outer layers 102 and 100 comprises the linear low density polyethylene having a melt index $I_2$ of 0.25 to 2.5 g/10 minutes when measured as per ASTM D 1238 at 190° C. and 2.16 kg. An exemplary LLDPE for use in the outer layers 102 and 110 is ELITE™ 5100, which is an ethylene-octene copolymer with melt index of 0.85 g/10 min (measured as per ASTM D1238 at 190° C. and 2.16 kg), density 0.920 g/cc (measured as per ASTM D 792), polydispersity index (PDI) Mw/Mn=3.45 and Mw=130,300 grams per mole, and commercially available from The Dow Chemical Company. Other exemplary LLDPE's that can be used in the outer layers 102 and 110 are linear ethylene-based polymers such as DOWLEX™ Polyethylene Resins, ELITE™ and ELITE AT™ brand enhanced polyethylene resin, all available from The Dow Chemical Company, and EXCEED™ metallocene polyethylenes, available from ExxonMobil Chemical Company.

Another exemplary polyethylene for use in the outer layers is homogeneously branched ethylene-α-olefin copolymers. These copolymers can be made with a single-site catalyst such as a metallocene catalyst or constrained geometry catalyst, and typically have a melting point of less than 105, specifically less than 90, more specifically less than 85, even more specifically less than 80 and still more specifically less than 75° C. The melting point is measured by differential scanning calorimetry (DSC) as described, for example, in U.S. Pat. No. 5,783,638. The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane.

Illustrative homogeneously branched ethylene-α-olefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random copolymers or block copolymers.

Examples of commercially available homogeneously branched ethylene-α-olefin interpolymers useful in the outer layers 102 and 110 include homogeneously branched, linear ethylene-α-olefin copolymers (e.g. TAFMER® by Mitsui Petrochemicals Company Limited and EXACT® by Exxon Chemical Company), and the homogeneously branched, substantially linear ethylene-α-olefin polymers (e.g., AFFINITY™ and ENGAGE™ polyethylene available from the Dow Chemical Company). Blends of any of these interpolymers can also be used in the outer layers 102 and 110. An exemplary ethylene-α-olefin copolymer that may be used in the outer layers 102 and 110 is AFFINITY™ PL1880G, commercially available from the Dow Chemical Company.

Low density polyethylene (LDPE) may also be used in the outer layers 102 and 110. The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides. LDPE and the methods of manufacturing LDPE are described in U.S. Pat. No. 4,599,392, incorporated herein in its entirety by reference.

The preferred LDPE for use in the outer layers 102 and 110 has a density in the range of from 0.915 to 0.930 g/cm$^3$ and a melt index of from 0.1 to 2.5 g/10 min, preferably less than or equal to 1 g/10 min.

High density polyethylene (HDPE) can also be used in the outer layers 102 and 110. The term "HDPE" refers to polyethylenes having densities greater than about 0.940 g/cm3, which are generally prepared with Ziegler-Natta catalysts, chrome catalysts or even metallocene catalysts. The HDPE has a melt index of from 0.4 to 2.5 g/10 min.

In one embodiment, the outer layers 102 and 110 can comprise a blend of LLDPE and LDPE, LLDPE and HDPE or a combination of LLDPE with LDPE and HDPE. When the outer layer comprise LLDPE with LDPE and/or HDPE, the LLDPE is used in an amount of 25 to 95 wt %, specifically 40 to 90 wt %, based on the total weight of the outer layer. The LDPE and/or HDPE may be used in amounts of 5 to 75 wt %, specifically 10 to 60 wt %, based on the total weight of the outer layer.

Each of the outer layers 102 and 110 has a thickness of 20 to 44%, specifically 30 to 40%, of the total thickness of the multilayer film 100.

The tie layers 104 and 108 are disposed on opposing sides of the third layer 106. With reference to the FIG. 1, each tie layer 104 and 108 has a first face and a second face that are on opposite sides of the tie layer. The tie layer 104 has a first face 103 that contacts the outer layer 102 and a second face 105 (that is opposedly disposed to the first face 103) that contacts the core layer 106. The tie layer 108 has a first face 109 that contacts the outer layer 110 and a second face 107 (that is opposedly disposed to the first face 109) that contacts the core layer 106. The tie layers 104 and 108 are operative to bond the outer layers 102 and 110 respectively to the core layer 106.

The tie layers 104 and 108 each comprise a crystalline block composite. In addition to the crystalline block composite, the tie layers 104 and 108 can optionally comprise either an ethylene-α-olefin copolymer or a polyolefin that comprises polypropylene and polyethylene.

Each of the tie layers comprises a crystalline block composite (CBC), also referred to herein as a crystalline block composite. The term "crystalline block composite" (CBC) refers to polymers having three components: a crystalline ethylene based polymer (CEP) (also referred to herein as a soft polymer), a crystalline alpha-olefin based polymer (CAOP) (also referred to herein as a hard polymer), and a block copolymer comprising a crystalline ethylene block (CEB) and a crystalline alpha-olefin block (CAOB), wherein the CEB of the block copolymer is the same composition as the CEP in the block composite and the CAOB of the block copolymer is the same composition as the CAOP of the block composite. Additionally, the compositional split between the amount of CEP and CAOP will be essentially the same as that between the corresponding blocks in the block copolymer. When produced in a continuous process, the crystalline block composites desirably have a polydispersity index (PDI) from 1.7 to 15, specifically 1.8 to 10, specifically from 1.8 to 5, more specifically from 1.8 to 3.5. Such crystalline block composites are described in, for example, US Patent Application Publication Nos. 2011/0313106, 2011/0313108 and 2011/0313108, all published on Dec. 22, 2011, incorporated herein by reference with respect to descriptions of the crystalline block composites, processes to make them and methods of analyzing them.

CAOB refers to highly crystalline blocks of polymerized alpha olefin units in which the monomer is present in an amount greater than 90 mol percent, specifically greater than 93 mol percent, more specifically greater than 95 mol percent, and specifically greater than 96 mol percent. In other words, the comonomer content in the CAOBs is less than 10 mol percent, and specifically less than 7 mol percent, and more specifically less than 5 mol percent, and most specifically less than 4 mol %. CAOBs with propylene crystallinity have corresponding melting points that are 80° C. and above, specifically 100° C. and above, more specifically 115° C. and above, and most specifically 120° C. and above. In some embodiments, the CAOB comprise all or substantially all propylene units. CEB, on the other hand, refers to blocks of polymerized ethylene units in which the comonomer content is 10 mol % or less, specifically between 0 mol % and 10 mol %, more specifically between 0 mol % and 7 mol % and most specifically between 0 mol % and 5 mol %. Such CEB have corresponding melting points that are specifically 75° C. and above, more specifically 90° C., and 100° C. and above.

In one embodiment, the crystalline block composite polymers comprise propylene, 1-butene or 4-methyl-1-pentene and one or more comonomers. Specifically, the block composites comprise in polymerized form propylene and ethylene and/or one or more $C_{4-20}$ α-olefin comonomers, and/or one or more additional copolymerizable comonomers or they comprise 4-methyl-1-pentene and ethylene and/or one or more $C_{4-20}$ α-olefin comonomers, or they comprise 1-butene and ethylene, propylene and/or one or more $C_5$-$C_{20}$ α-olefin comonomers and/or one or more additional copolymerizable comonomers. Additional suitable comonomers are selected from diolefins, cyclic olefins, and cyclic diolefins, halogenated vinyl compounds, and vinylidene aromatic compounds. Preferably, the monomer is propylene and the comonomer is ethylene.

Comonomer content in the crystalline block composite polymers may be measured using any suitable technique, with techniques based on nuclear magnetic resonance (NMR) spectroscopy preferred.

The block composites and crystalline block composites have a melting point Tm greater than 100° C. specifically greater than 120° C., and more specifically greater than 125° C. In an embodiment, the Tm is in the range of from 100° C. to 250° C., more specifically from 120° C. to 220° C. and also specifically in the range of from 125° C. to 220° C. Specifically the melt flow ratio (MFR) of the block composites and crystalline block composites is from 0.1 to 1000 dg/min, more specifically from 0.1 to 50 dg/min and more specifically from 0.1 to 30 dg/min.

In an embodiment, the block composites and crystalline block composites have a weight average molecular weight (Mw) from 10,000 to about 2,500,000 grams per mole (g/mole), specifically from 35000 to about 1,000,000 and more specifically from 50,000 to about 300,000, specifically from 50,000 to about 200,000 g/mole.

The crystalline block composite polymers comprise 0.5 to 95 wt % soft copolymer, from 0.5 to 95 wt % hard polymer and from 5 to 99 wt % block copolymer. More specifically, the crystalline block composite polymers comprise from 0.5 to 79 wt % soft copolymer, from 0.5 to 79 wt % hard polymer and from 20 to 99 wt % block copolymer and more specifically from 0.5 to 49 wt % soft copolymer, from 0.5 to 49 wt % hard polymer and from 50 to 99 wt % block copolymer. Weight percents are based on total weight of crystalline block composite. The sum of the weight percents of soft copolymer, hard polymer and block copolymer equals 100%.

In an embodiment, the crystalline block composite polymers comprises 0.5 to 95 wt % CEP, from 0.5 to 95 wt % CAOP and from 5 to 99 wt % block copolymer. More specifically, the crystalline block composite polymers comprise 0.5 to 79 wt % CEP, 0.5 to 79 wt % CAOP and 20 to 99 wt % block copolymer and more specifically 0.5 to 49 wt % CEP, 0.5 to 49 wt % CAOP and 50 to 99 wt % block copolymer. Weight percents are based on total weight of crystalline block composite. The sum of the weight percents of CEP, CAOP and block copolymer equals 100%.

In an embodiment, the block copolymers of the crystalline block composite comprise from 5 to 95 weight percent crystalline ethylene blocks (CEB) and 95 to 5 wt percent crystalline alpha-olefin blocks (CAOB). They may comprise 10 wt % to 90 wt % CEB and 90 wt % to 10 wt % CAOB. More specifically, the block copolymers comprise 25 to 75 wt % CEB and 75 to 25 wt % CAOB, and even more specifically comprise 30 to 70 wt % CEB and 70 to 30 wt % CAOB.

In some embodiments, the crystalline block composites have a Crystalline Block Composite Index (CBCI that is greater than zero but less than about 0.4 or from 0.1 to 0.3. In other embodiments, CBCI is greater than 0.4 and up to 1.0. In some embodiments, the CBCI is 0.1 to 0.9, from about 0.1 to about 0.8, from about 0.1 to about 0.7 or from about 0.1 to about 0.6. Additionally, the CBCI can be in the range of from about 0.4 to about 0.7, from about 0.5 to about 0.7, or from about 0.6 to about 0.9. In some embodiments, CBCI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, CBCI is in the range of from about 0.4 to up to about 1.0, from about 0.5 to up to about 1.0, or from about 0.6 to up to about 1.0, from about 0.7 to up to about 1.0, from about 0.8 to up to about 1.0, or from about 0.9 to up to about 1.0.

The tie layers 104 and 108 may also comprise in addition to the crystalline block composite (CBC), an optional elastomer and/or an optional polypropylene or polyethylene. The optional elastomer can be an ethylene-α-olefin copolymer (which is already detailed above), a polyolefin elastomer (e.g., a propylene based elastomer), a vinyl aromatic block copolymer, or the like, or a combination comprising at least one of the foregoing elastomers.

The polyolefin elastomers may also comprise random or block propylene polymers (i.e., polypropylenes). The random polypropylene elastomer typically comprises 90 or more mole percent units derived from propylene. The remainder of the units in the propylene copolymer is derived from units of at least one α-olefin.

The α-olefin component of the propylene copolymer is preferably ethylene (considered an α-olefin for purposes of this invention) or a $C_{4-20}$ linear, branched or cyclic α-olefin. Examples of $C_{4-20}$ α-olefins include 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, certain cyclic olefins, such as norbornene and related olefins, particularly 5-ethylidene-2-norbornene, are α-olefins and can be used in place of some or all of the α-olefins described above. Similarly, styrene and its related olefins (for example,
α-methylstyrene, and the like) are α-olefins for purposes of this invention. Illustrative random propylene copolymers include but are not limited to propylene/ethylene, propylene/1-butene, propylene/1-hexene, propylene/1-octene, and the like. Illustrative terpolymers include ethylene/propylene/1-octene, ethylene/propylene/1-butene, and ethylene/propylene/diene monomer (EPDM).

In one embodiment the random polypropylene copolymer has a $T_m$ greater than 120° C., and/or a heat of fusion greater than 70 J/g (both measured by DSC) and preferably, but not necessarily, made via Ziegler-Natta catalysis.

In another embodiment, the polyolefin elastomer is a propylene-α-olefin interpolymer and is characterized as having substantially isotactic propylene sequences. The propylene-α-olefin interpolymers include propylene-based elastomers (PBE). "Substantially isotactic propylene sequences" means that the sequences have an isotactic triad (mm) measured by $^{13}C$ NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}CNMR$ spectra.

The propylene-α-olefin copolymer comprises units derived from propylene and polymeric units derived from one or more α-olefin comonomers. Exemplary comonomers utilized to manufacture the propylene-α-olefin copolymer are $C_2$ and $C_4$ to $C_{10}$ α-olefins; for example, $C_2$, $C_4$, $C_6$ and $C_8$ α-olefins.

The propylene-α-olefin interpolymer comprises 1 to 40 percent by weight of one or more alpha-olefin comonomers. All individual values and sub-ranges from 1 to 40 weight percent are included herein and disclosed herein. The propylene-α-olefin interpolymer may have a melt flow rate in the range of 0.1 to 500 grams per 10 minutes (g/10 min), measured in accordance with ASTM D-1238 (at 230° C./2.16 Kg). The propylene-α-olefin interpolymer has crystallinity in the range of from at least 1 percent by weight (a heat of fusion ($H_f$) of at least 2 Joules/gram (J/g)) to 30 percent by weight (a $H_f$ of less than 50 J/g). The propylene-α-olefin interpolymer has a density of typically less than 0.895 g/cm$^3$. The propylene-α-olefin interpolymer has a melting temperature ($T_m$) of less than 120° C. and a heat of fusion ($H_f$) of less than 70 Joules per gram (J/g) as measured by differential scanning calorimetry (DSC) as described in U.S. Pat. No. 7,199,203. The propylene-α-olefin interpolymer has a molecular weight distribution (MWD), defined as weight average molecular weight divided by number average molecular weight (Mw/Mn) of 3.5 or less; or 3.0 or less; or from 1.8 to 3.0.

Such propylene-α-olefin interpolymers are further described in the U.S. Pat. Nos. 6,960,635 and 6,525,157, the entire contents of which are incorporated herein by reference. Such propylene-α-olefin interpolymers are commercially available from The Dow Chemical Company, under the trade name VERSIFY™, or from ExxonMobil Chemical Company, under the trade name VISTAMAXX™.

The term vinyl aromatic block copolymer means a polymer having at least one block segment of a vinyl aromatic monomer in combination with at least one saturated or unsaturated elastomeric monomer segment, and more preferably not having a block of polymer that is neither elastomeric nor vinyl aromatic. Examples of vinyl aromatic block copolymers are "styrene block copolymer or styrenic block copolymer". The term 'styrene block copolymer" or "styrenic block copolymer" means a polymer having at least one block segment of a styrenic monomer in combination with at least one saturated or unsaturated elastomer (rubber) monomer segment, and more preferably not having a block of polymer that is neither rubber or styrenic. Suitable styrene block copolymers having unsaturated rubber monomer units include styrene-butadiene (SB), styrene-isoprene (SI), styrene-butadiene-styrene (SBS), styrene-isoprene-styrene (SIS), α-methylstyrene-butadiene-α-methylstyrene, α-methylstyrene-isoprene-α-methylstyrene, and the like.

The term "styrene butadiene block copolymer" is used herein inclusive of SB, SBS and higher numbers of blocks of styrene (S) and butadiene (B). Similarly, the term "styrene isoprene block copolymer" is used inclusive of polymers having at least one block of styrene and one of isoprene (I). The structure of the styrene block copolymers can be of the linear or radial type, and of the diblock, triblock or higher block type. In some embodiments, the styrenic block copolymers having at least four different blocks or a pair of two repeating blocks, for example, repeating styrene/butadiene or styrene/ethylene propylene blocks are desirable. Styrene block copolymers are commercially available from Dexco Polymers under the trademark VECTOR®, from KRATON Polymers under the trademark KRATON™, from Chevron Phillips Chemical Co. under the trademark SOLPRENE™ and K-Resin, and from BASF Corp. under the trade designation STYROLUX™. The styrene block copolymers are optionally used singly or in combinations of two or more.

The styrenic portion of the block copolymer is preferably a polymer or interpolymer of styrene or its analogs or homologs, including α-methylstyrene, and ring-substituted styrenes, particularly ring-methylated styrenes. Preferred styrenics are styrene and α-methylstyrene, with styrene being especially preferred.

The elastomer portion of the styrenic block copolymer is optionally either unsaturated or saturated. Block copolymers with unsaturated elastomer monomer units may comprise homopolymers of butadiene or isoprene and copolymers of one or both of these two dienes with a minor amount of styrenic monomer. When the monomer employed is butadiene, it is preferred that between about 35 and about 55 mole percent of the condensed butadiene units in the butadiene polymer block have a 1,2-configuration. When such a block is hydrogenated, the resulting product is, or resembles, a regular copolymer block of ethylene and 1-butene (EB). If the conjugated diene employed is isoprene, the resulting hydrogenated product is or resembles a regular copolymer block of ethylene and propylene (EP). Preferred block copolymers have unsaturated elastomer monomer units, more preferably including at least one segment of a styrenic unit and at least one segment of butadiene or isoprene, with SBS and SIS most preferred. Among these, SIS is preferred because it has been found to be particularly effective to compatibilize polypropylene with other polymers in the composition. Furthermore, it is preferred because of a lower tendency to crosslink forming gels during manufacture as compared to SBS. Styrene butadiene block copolymers are alternatively preferred when a cast tenter line is used in manufacturing a film when its higher clarity and lower haze are advantageous.

Elastomeric styrene block copolymers provide toughness and lower stiffness than would be obtained in the absence of the block copolymer. Elastomeric behavior is indicated by a property of tensile percent elongation at break of advantageously at least about 200, specifically at least about 220, more specifically at least about 240, most specifically at least about 260 and specifically at most about 2000, more specifically at most about 1700, most specifically at most about 1500 percent as measured by the procedures of ASTM D412 and/or ASTM D882. Industrially, most polymers of this type contain 10-80 wt % styrene. Within a specific type and morphology of polymer, as the styrene content increases the elastomeric nature of the block copolymer decreases.

The block copolymers desirably have a melt flow rate (MFR) of at least about 2, specifically at least about 4 grams per 10 minutes (g/10 min), specifically 20 g/10 min, and more specifically 30 g/10 min. Measure MFR according to ASTM method D1238 Condition G.

Preferred styrenic block copolymers include styrene-isoprene-styrene block copolymers ("SIS"), styrene-butadiene-styrene block copolymers ("SBS"), styrene-ethylene-propylene block copolymers ("SEP"), and hydrogenated styrenic block copolymer such as styrene-(ethylene butylene)-styrene block copolymers ("SEBS") (e.g., the SEBS commercially available from Kraton Polymers LLC under the trade designation KRATON™ 1657). Preferably, the styrenic block copolymer used in the tie layer is SBS.

In one embodiment, the styrene butadiene block copolymer has a radial or star block configuration with polybutadiene at the core and polystyrene at the tips of the arms. Such polymers are referred to herein as star styrene butadiene block copolymers and are within the skill in the art and commercially available from Chevron Phillips Chemical Co. under the trade designation K-Resin. These polymers contain about 27% butadiene or more in a star-block form and often feature a bimodal molecular weight distribution of polystyrene. The inner polybutadiene segments are of about the same molecular weight while the outer polystyrene segments are of different molecular weight. This feature facilitates control of polybutadiene segment thickness, to obtain improved clarity. For high clarity, the polybutadiene segment thickness is preferably about one-tenth of the wavelength of visible spectrum or less.

The ethylene-α-olefin copolymer has been described above as has the polyethylene and will not be detailed again. The polypropylene will be detailed below with reference to the core layer 106.

The CBC can be used in the tie layers in an amount of 100 wt %. When the tie layers 104 and 108 comprise the crystalline block composite (CBC) and the optional elastomer and/or an optional polypropylene or polyethylene, the CBC may be used in amounts of 10 to 90 wt %, specifically 20 to 80 wt %, and more specifically 30 to 70 wt %, based on the total weight of the tie layers 104 and 108. If the elastomer is used, it is present in amounts of up to 50 wt %, specifically 5 to 45 wt %, based on the total weight of the tie layers 104 and 108. If polypropylene and/or polyethylene are used in the tie layers, they can be used either individually or in combination in amounts of up to 50 wt %, specifically 5 to 45 wt %, based on the total weight of the tie layers 104 and 108.

The tie-layers 104 and 108 each have a thickness of 1 to 20%, specifically 2 to 10%, specifically 3 to 8% and more specifically 4 to 6% of the total thickness of the multilayer film.

The core layer 106 comprises polypropylene. It may also optionally comprise an elastomer and polyethylene in addition to the propylene. The polypropylene is selected from random copolymer polypropylene (rcPP), impact copolymer polypropylene (hPP+ at least one elastomeric impact modifier) (ICPP) or high impact polypropylene (HIPP), high melt strength polypropylene (HMS-PP), isotactic polypropylene (iPP), syndiotactic polypropylene (sPP), or a combination comprising at least one of the foregoing polypropylenes.

The polypropylene is generally in the isotactic form of homopolymer polypropylene, although other forms of polypropylene can also be used (e.g., syndiotactic or atactic). Polypropylene impact copolymers (e.g., those wherein a secondary copolymerization step reacting ethylene with the propylene is employed) and random copolymers (also reactor modified and usually containing 1.5-7% ethylene copolymerized with the propylene), however, can also be used in the TPO formulations disclosed herein. A complete discussion of various polypropylene polymers is contained in Modern Plastics Encyclopedia/89, mid October 1988 Issue, Volume 65, Number 11, pp. 86-92, the entire disclosure of which is incorporated herein by reference. The molecular weight and hence the melt flow rate of the polypropylene for use in the present invention varies depending upon the application. The melt flow rate for the polypropylene useful herein is generally from about 0.1 grams/10 minutes (g/10 min) to about 100 g/10 min specifically 0.5 g/10 min to about 80 g/10 min, and specifically 4 g/10 min to about 70 g/10 min (measured as per ASTM D1238 at 230° C. and 2.16 kg). The propylene polymer can be a polypropylene homopolymer, or it can be a random copolymer or even an impact copolymer (which already contains a rubber phase). Examples of such propylene polymers include Vistamaxx™ (made by Exxon Mobil), VERSIFY™ (made by The Dow Chemical Co.), INSPIRE (made by Braskem), and Pro-fax (made by LyondellBasell).

The core layer 106 may contain polypropylene in an amount of 40 to 100 wt %, specifically 50 to 90 wt %, based on the total weight of the core layer 106.

The core layer 106 may optionally contain an elastomer in an amount of up to 40 wt %, specifically 10 to 35 wt %, based on the total weight of the core. The elastomer can be an ethylene-α-olefin copolymer (which is already detailed above), a polyolefin elastomer (e.g., a propylene based elastomer), a vinyl aromatic block copolymer, or a combination thereof as detailed above. The core layer may also contain polyethylene in an amount of up to 40 wt %, specifically 10 to 35 wt %, based on the total weight of the core. The polyethylenes have been described above, and will not be detailed here again.

The core layer 106 has a thickness of 10 to 40%, specifically 15 to 30%, based on the total thickness of the multilayered film 100. In an exemplary embodiment, the core layer 106 always has a thickness that is less than 20% of the total thickness of the multilayered film 100. Each layer of the multilayer film 100 may contain other additives such as waxes, antioxidants, antiozonants, mold release agents, biocides, thermal stabilizers, pigments, dyes, infrared absorption agents, ultraviolet stabilizers, or the like, or a combination comprising at least one of the foregoing additives.

As noted above, one of more layers of the multilayer can optionally comprise a wax that may reduce the melt viscosity in addition to reducing costs. Non-limiting examples of suitable waxes include petroleum waxes, polyolefin waxes such as low molecular weight polyethylene or polypropylene, synthetic waxes, paraffin and microcrystalline waxes having melting points from about 55 to about 110° C., Fischer-Tropsch waxes, or a combination comprising at least one of the foregoing waxes. In some embodiments, the wax is a low molecular weight polyethylene homopolymer or interpolymer having a number average molecular weight of about 400 to about 6,000 g/mole.

In further embodiments, each of the layers of the multilayer film can optionally comprise an antioxidant or a stabilizer. Non-limiting examples of suitable antioxidants include amine-based antioxidants such as alkyl diphenylamines, phenyl-α-naphthylamine, alkyl or aralkyl substituted phenyl-α-naphthylamine, alkylated p-phenylene diamines, tetramethyl-diaminodiphenylamine and the like; and hindered phenol compounds such as 2,6-di-t-butyl-4-methylphenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamate)]methane (e.g., IRGANOX™ 1010, from Ciba Geigy, New York); octadecyl-3,5-di-t-butyl-4-hydroxycinnamate (e.g., IRGANOX™ 1076, commercially available from Ciba Geigy) and combinations thereof. Where used, the amount of the antioxidant in the composition can be up to about 1 wt %, specifically 0.05 to 0.75 wt %, and specifically 0.1 to 0.5 wt %, based on the total weight of any particular layer.

In further embodiments, the compositions disclosed herein optionally can comprise an UV stabilizer that may prevent or reduce the degradation of the compositions by UV radiation. Non-limiting examples of suitable UV stabilizers include benzophenones, benzotriazoles, aryl esters, oxanilides, acrylic esters, formamidine carbon black, hindered amines, nickel quenchers, hindered amines, phenolic antioxidants, metallic salts, zinc compounds, or the like, or a combination comprising at least one of the foregoing UV stabilizers. Where used, the amount of the UV stabilizer in any particular layer can be from about greater than 0 to about 1 wt %, specifically 0.05 to 0.75 wt %, and specifically 0.1 to 0.5 wt %, based on the total weight of a particular layer.

In further embodiments, the compositions disclosed herein optionally can comprise a colorant or pigment. Any colorant or pigment known to a person of ordinary skill in the art may be used in the adhesion composition disclosed herein. Non-limiting examples of suitable colorants or pigments include inorganic pigments such as titanium dioxide and carbon black, phthalocyanine pigments, and other organic pigments such as IRGAZIN®, CROMOPHTAL®, MONASTRAL®, CINQUASIA®, IRGALITE®, ORASOL®, all of which are available from Ciba Specialty Chemicals, Tarrytown, N.Y. Where used, the amount of the colorant or pigment in any particular layer can be present in an amount of up to 10 wt %, specifically 0.1 to 5 wt %, and more specifically 0.5 to 2 wt %, based on the total weight of any particular layer of the multilayered film.

In one embodiment, in one method of manufacturing the film 100, the respective compositions for each of the layers 102, 104, 106, 108 and 110 of the multilayered film 100 is fed to a separate device in which it is subjected to shear, extensional and elongational forces. The device that exerts the foregoing forces on the composition can be conducted in an extruder (single screw or twin screw), a Henschel mixer, a Waring blender, a Buss Kneader, a Banbury, a roll mill (two or more rolls), high shear impeller disperser, dough mixer, or the like. The ingredients for any layer in the multilayered film may be dry mixed or solution blended in either a Henschel mixer, a Waring blender, a high shear impeller disperser, or the like, prior to being extruded.

In an exemplary embodiment, the composition for each of the respective layers is fed to separate extruders. The composition for the outer layer 102 is fed to a first extruder, the composition for the tie layer 104 is fed to a second extruder, the composition for the core layer 106 is fed to a third extruder, the composition for the tie layer 108 is fed to a fourth extruder and the composition for the outer layer 110 is fed to the fifth extruder. The compositions from the respective extruders are fed to a single die and are coextruded to form the multilayered film. The coextruded film is then blown to form a multilayered film of the desired thickness. In an embodiment, the multilayered film after being coextruded is laminated in a roll mill having two or more rolls.

Figure 2:
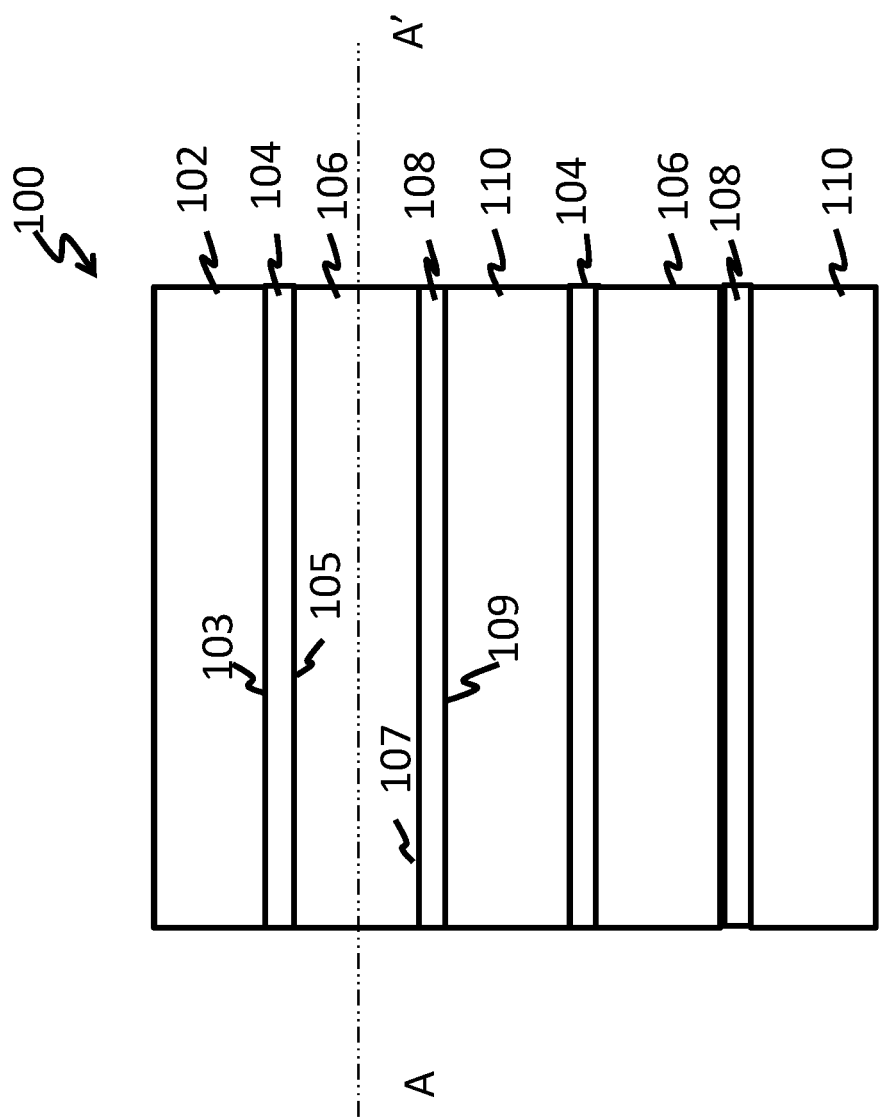
FIG. 2 depicts an exemplary embodiment of a multilayered film that comprises two multilayered films of the FIG. 1 that are coextruded or laminated together.

As detailed above, a plurality of multilayered films may be laminated together to form a single multilayered film. When two or more multilayered films are laminated together, at least one of the common layers may be omitted if desired. For example, if two multilayered films are laminated together as shown in the FIG. 2, then at least one of the outer layers 102 or 110 may be omitted. Thus while a single multilayered film contains 5 layers, two multilayered films laminated together will contain 9 layers, and three multilayered films will contain 13 layers.

The multilayered films disclosed herein are advantageous in that the presence of a core layer that comprises polypropylene in the multilayered film provides it with improved stiffness, high machine direction tear resistance, strong heat seal strength without interlayer delamination, high creep resistance, high temperature performance and oil/crease resistance, which enables the multilayered film to be used for bagging and shipping large masses of material or products.

The multilayered films disclosed herein and the method of manufacturing the films is exemplified in the following examples.

EXAMPLES

Example 1

This example demonstrates the disclosed multilayered films and methods of manufacture thereof. These examples were also conducted to demonstrate the properties of the multilayered films over comparative multilayered films.

Dart Drop Impact: This test measures the energy, as a function of mass and drop height, required to cause failure of 50% of the specimens tested. The result is given in grams. Type A darts have heads 1.5 inches in diameter and drop from a height of 26 inches. Type B darts have heads 2 inches in diameter and drop from a height of 60 inches. Specimen failure is defined as any break through the film that can be observed readily by feeling or by viewing under back lighted conditions. Type A and Type B Dart Impact cannot be directly correlated. The test is based upon ASTM STM D 1709.

Elmendorf Tear test: This test is based upon ASTM D 1922. Tear strength is measured using a pendulum impact tester to measure the force required to propagate an existing slit a fixed distance to the edge of the test sample. Fifteen samples are prepared using a specific die cutter. These samples are positioned in the tester and clamped in place. A cutting knife in the tester is used to create a slit in the sample which ends 43 mm from the far edge of the sample. The pendulum is released to propagate the slit through the remaining 43 mm. The energy loss by the pendulum is used to calculate an average tearing force. This test is a Constant Radius test.

Secant Modulus testing: This test, also based upon ASTM D 882, covers the determination of the tensile, or extension, properties of plastics in the form of thin sheeting, including film, which is less than 1 mm (0.04 in) in thickness. Film is defined as having a nominal thickness not greater than 0.25 mm (0.010 in). In this test, the plastic material is pulled until in breaks in order to measure elongation, modulus, tensile yield strength, and tensile strength at break. All specimens are prepared and tested in exactly the same way. For this test, the samples are rectangular and are prepared using a die cutter. For testing tensile strength, the separation speed on the tensile tester is set to 2 in/min. All tests are done on an Instron-type piece of equipment. The secant modulus measurement is a sub-measurement of this test. The modulus is calculated by dividing the tensile stress by the corresponding strain for the linear portion of the curve, or for an extension of the linear line. If there is no linear behavior, a tangent is drawn at the inflection point, to provide toe compensation by using the intersection of the tangent line with the strain axis as zero strain. The secant modulus can then be calculated as the ratio of stress to corrected strain at any point on the curve. Values for secant modulus are reported at 1 and 2% strain.

Tensile Strength: This test, also based upon ASTM D 882, covers the determination of the tensile, or extension, properties of plastics in the form of thin sheeting, including film, which is less than 1 mm (0.04 in) in thickness. Film is defined as having a nominal thickness not greater than 0.25 mm (0.010 in). In this test, the plastic material is pulled until in breaks in order to measure elongation, modulus, tensile yield strength, and tensile strength at break. All specimens are prepared and tested in exactly the same way. For this test, the samples are rectangular and are prepared using a die cutter. For testing tensile strength, the separation speed on the tensile tester is set to 20 in/min. All tests are done on an Instron-type piece of equipment.

Heat Seal test: This work instruction is based upon ASTM Standard Test Method F88, STM for Seal Strength of Flexible Barrier Materials. It measures the force required to separate a test strip of material containing the seal. It also identifies the mode of specimen failure. Specimens are die cut strips that are one inch in width. The test result is a measure of the force required to pull apart the heat seal, or the force required to break the film in cases where the film breaks before the heat seal parts.

The materials used in the various layers of the multilayered film (for this example and for succeeding examples) are detailed in Table 1 below.

TABLE 1

| Material | Description |
| --- | --- |
| CBC1 | 50/50 EP/iPP, 90 wt % C2 in EP, 6.7 melt flow ratio (MFR)* |
| CBC2 | 50/50 EP/iPP, 90 wt % C2 in EP, 6.8 MFR |
| INSPIRE 114 | Impact copolymer polypropylene, 0.5 MFR, Braskem |
| INSPIRE 118 | High crystallinity polypropylene, 8.0 MFR, Braskem |
| PP 6D83K | Polypropylene random copolymer, 1.9 MFR, Braskem |
| PP H110-02N | Polypropylene homopolymer, 2.0 MFR, Braskem |
| Adstif HA802H | High crystallinity polypropylene, 2.3 MFR, LyondellBasell Industries |
| ELITE ™ 5100G | Enhanced Polyethylene Resin, 0.920 g/cm$^3$, 0.85 melt index (MI)**, The Dow Chemical Company |
| ELITE ™ 5400G | Enhanced Polyethylene Resin, 0.916 g/cm$^3$, 1.0 MI, The Dow Chemical Company |

TABLE 1-continued

| Material | Description |
|---|---|
| LDPE 133A | LDPE, 0.923 g/cm³, 0.25 MI, The Dow Chemical Company |
| AFFINITY ™ PL1880G | Polyolefin plastomer, 0.902 g/cm³, 1.0 MI, The Dow Chemical Company |
| ENGAGE™ 8100 | Polyolefin elastomer, 0.870 g/cm³, 1.0 MI, The Dow Chemical Company |
| ENGAGE ™ 8150 | Polyolefin elastomer, 0.870 g/cm³, 0.5 MI, The Dow Chemical Company |
| VERSIFY ™ 3000 | Propylene-ethylene copolymer, 0.888 g/cm³, 8 MFR, The Dow Chemical Company |
| VERSIFY ™ 2200 | Propylene-ethylene copolymer, 0.876 g/cm³, 2 MFR, The Dow Chemical Company |

*Melt flow rate (MFR): measured as per ASTM D1238 at 230° C. and 2.16 kg
**Melt index (MI): measured as per ASTM D1238 at 190° C. and 2.16 kg Referring to Table 1, CBC 1 and CBC2 is prepared using two continuous stirred tank reactors (CSTR) connected in series. The first reactor is approximately 12 gallons in volume while the second reactor is approximately 26 gallons. Each reactor is hydraulically full and set to operate at steady state conditions. Monomers, Solvent, Catalyst, Cocatalyst-1, Cocatalyst-2, and CSA-1 are flowed to the first reactor according to the process conditions outlined in Table 1. Then, the first reactor contents, as described in Table 1A, below, are flowed to a second reactor in series. Additional Catalyst, Cocatalyst-1, and Cocatalyst-2 are added to the second reactor. Table 1B, below, shows the analytical characteristics of CBC1 and CBC2.

Catalyst-1 ([[rel-2',2'''-[(1R,2R)-1,2-cylcohexanediylbis(methyleneoxy-κO)] bis[3-(9H-carbazol-9-yl)-5-methyl[1,1'-biphenyl]-2-olato-κO]](2-)]dimethyl-hafnium) and Cocatalyst-1, a mixture of methyldi($C_{14-18}$alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,983, Ex. 2., are purchased from Boulder Scientific and used without further purification.

CSA-1 (diethylzinc or DEZ) and cocatalyst-2 (modified methylalumoxane (MMAO)) are purchased from Akzo Nobel and used without further purification. The Solvent for the polymerization reaction is a hydrocarbon mixture (ISOPAR®E) obtainable from ExxonMobil Chemical Company and purified through beds of 13-X molecular sieves prior to use.

The process conditions for producing CBC1 and CBC2 are shown in Table 1A.

TABLE 1A

| | CBC1 | | CBC2 | |
|---|---|---|---|---|
| Condition | 1st Reactor | 2nd reactor | 1st Reactor | 2nd reactor |
| Reactor Control Temp. (° C.) | 140 | 129 | 141 | 135 |
| Solvent Feed (lb/hr) | 241 | 245 | 242 | 245 |
| Propylene Feed (lb/hr) | 5.5 | 48.6 | 5.4 | 48.8 |
| Ethylene Feed (lb/hr) | 46.0 | 0 | 47.0 | 0.0 |
| Hydrogen Feed (sccm) | 9.7 | 49.8 | 9.5 | 0.0 |
| Reactor Propylene Conc. (g/L) | 3.20 | 1.46 | 3.57 | 2.26 |
| Catalyst Efficiency (gPoly/gM) * 1.0E6 | 1.390 | 0.04 | 0.706 | 0.075 |
| Catalyst Flow (lb/hr) | 0.24 | 2.25 | 0.47 | 1.78 |
| Catalyst Conc. (ppm) | 150 | 500 | 150 | 500 |
| Cocatalyst-1 Flow (lb/hr) | 0.24 | 1.41 | 1.41 | 1.12 |
| Cocatalyst-1 Conc. (ppm) | 2000 | 8000 | 500 | 8000 |
| Cocatalyst-2 Flow (lb/hr) | 1.27 | 1.41 | 1.18 | 0.75 |
| Cocat.-2 Conc. (ppm) | 1993 | 1800 | 1993 | 1993 |
| CSA-1 Flow (lb/hr) | 1.35 | 0 | 1.89 | 0 |
| CSA-1 Conc. (ppm) | 45000 | 0 | 30000 | 0 |

The properties for crystalline block composites (CBC1) and (CBC2) from Table 1 are shown in the Table 1B.

TABLE 1B

| Example | MFR (230° C./ 2.16 kg) | Wt % PP from HTLC Separation | Mw Kg/mol | Mw/Mn | Total Wt % $C_2$ | Tm (° C.) Peak 1 (Peak 2) | Melt Enthalpy (J/g) | Crystalline Block Composite Index |
|---|---|---|---|---|---|---|---|---|
| CBC1 | 6.7 | 19.6 | 114 | 2.90 | 48.3 | 131 (105) | 90 | 0.579 |
| CBC2 | 6.8 | 21.3 | 117 | 3.14 | 46.7 | 128 (105) | 88 | 0.560 |

Polymer Characterization Methods, a discussion of the methods used may also be found in, e.g., U.S. Patent Publication Nos. 2011/0313106, 2011/0313107, and 2011/0313108.

Melt flow rate (MFR) is measured in accordance with ASTM D-1238 (230° C.; 2.16 kg). The result is reported in grams/10 minutes.

High Temperature Liquid Chromatography (HTLC) is performed according to the methods disclosed in U.S. Pat. No. 8,076,147 and US Patent Application Publication No.

2011/152499, both of which are herein incorporated by reference. Samples are analyzed by the methodology described below.

A Waters GPCV2000 high temperature SEC chromatograph is reconfigured to build the HT-2DLC instrumentation. Two Shimadzu LC-20AD pumps are connected to the injector valve in GPCV2000 through a binary mixer. The first dimension (D1) HPLC column is connected between the injector and a 10-port switch valve (Valco Inc). The second dimension (D2) SEC column is connected between the 10-port valve and LS (Varian Inc.), IR (concentration and composition), RI (refractive index), and IV (intrinsic viscosity) detectors. RI and IV are built-in detector in GPCV2000. The IRS detector is provided by PolymerChar, Valencia, Spain.

Columns: The D1 column is a high temperature Hypercarb graphite column (2.1×100 mm) purchased from Thermo Scientific. The D2 column is a PLRapid-H column purchased from Varian (10×100 mm).

Reagents: HPLC grade trichlorobenzene (TCB) is purchased from Fisher Scientific. 1-Decanol and decane are from Aldrich. 2,6-Di-tert-butyl-4-methylphenol (Ionol) is also purchased from Aldrich.

Sample Preparation: 0.01-0.15 g of polyolefin sample is placed in a 10-mL Waters autosampler vial. 7-mL of either 1-decanol or decane with 200 ppm Ionol is added to the vial afterwards. After sparging helium to the sample vial for about 1 min, the sample vial is put on a heated shaker with temperature set at 160° C. The dissolution is done by shaking the vial at the temperature for 2 hr. The vial is then transferred to the autosampler for injection.

HT-2DLC: The D1 flow rate is at 0.01 mL/min. The composition of the mobile phase is 100% of the weak eluent (1-decanol or decane) for the first 10 min of the run. The composition is then increased to 60% of strong eluent (TCB) in 489 min. The data is collected for 489 min as the duration of the raw chromatogram. The 10-port valve switches every three minutes yielding 489/3=163 SEC chromatograms. A post-run gradient is used after the 489 min data acquisition time to clean and equilibrate the column for the next run:

Clean Step:
1. 490 min: flow=0.01 min; // Maintain the constant flow rate of 0.01 mL/min from 0-490 min.
2. 491 min: flow=0.20 min; // Increase the flow rate to 0.20 mL/min.
3. 492 min: % B=100; // Increase the mobile phase composition to 100% TCB
4. 502 min: % B=100; // Wash the column using 2 mL of TCB Equilibrium Step:
5. 503 min: % B=0; // Change the mobile phase composition to 100% of 1-decanol or decane
6. 513 min: % B=0; // Equilibrate the column using 2 mL of weak eluent
7. 514 min: flow=0.2 mL/min; // Maintain the constant flow of 0.2 mL/min from 491-514 min
8. 515 min: flow=0.01 mL/min; // Lower the flow rate to 0.01 mL/min.

After step 8, the flow rate and mobile phase composition are the same as the initial conditions of the run gradient.

The D2 flow rate was at 2.51 mL/min. Two 60 μL loops are installed on the 10-port switch valve. 30-μL of the eluent from D1 column is loaded onto the SEC column with every switch of the valve.

The IR, LS15 (light scattering signal at 15°), LS90 (light scattering signal at) 90°), and IV (intrinsic viscosity) signals are collected by EZChrom through a SS420X analogue-to-digital conversion box. The chromatograms are exported in ASCII format and imported into a home-written MATLAB software for data reduction. Using an appropriate calibration curve of polymer composition and retention volume, of polymers that are of similar nature of the hard block and soft block contained in the block composite being analyzed. Calibration polymers should be narrow in composition (both molecular weight and chemical composition) and span a reasonable molecular weight range to cover the composition of interest during the analysis. Analysis of the raw data was calculated as follows, the first dimension HPLC chromatogram was reconstructed by plotting the IR signal of every cut (from total IR SEC chromatogram of the cut) as a function of the elution volume. The IR vs. D1 elution volume was normalized by total IR signal to obtain weight fraction vs. D1 elution volume plot. The IR methyl/measure ratio was obtained from the reconstructed IR measure and IR methyl chromatograms. The ratio was converted to composition using a calibration curve of PP wt. % (by NMR) vs. methyl/measure obtained from SEC experiments. The MW was obtained from the reconstructed IR measure and LS chromatograms. The ratio was converted to MW after calibration of both IR and LS detectors using a PE standard.

Molecular weight distribution (MWD) is measured using Gel Permeation Chromatography (GPC). In particular, conventional GPC measurements are used to determine the weight-average (Mw) and number-average (Mn) molecular weight of the polymer, and to determine the MWD (which is calculated as Mw/Mn). Samples are analyzed with a high-temperature GPC instrument (Polymer Laboratories, Inc. model PL220). The method employs the well-known universal calibration method, based on the concept of hydrodynamic volume, and the calibration is performed using narrow polystyrene (PS) standards, along with four Mixed A 20 μm columns (PLgel Mixed A from Agilent (formerly Polymer Laboratory Inc.)) operating at a system temperature of 140° C. Samples are prepared at a "2 mg/mL" concentration in 1,2,4-trichlorobenzene solvent. The flow rate is 1.0 mL/min, and the injection size is 100 microliters.

As discussed, the molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, (621) 1968) to derive the following equation:

$$M\text{polyethylene} = a * (M\text{polystyrene})^b.$$

In this equation, a=0.4316 and b=1.0 (as described in Williams and Ward, J. Polym. Sc., Polym. Let., 6, 621 (1968)). Polyethylene equivalent molecular weight calculations were performed using VISCOTEK TriSEC software Version 3.0.

$^{13}$C Nuclear Magnetic Resonance (NMR) is performed using samples that are prepared by adding approximately 2.7 g of a 50/50 mixture of tetrachloroethane-d2/orthodichlorobenzene that is 0.025M in chromium acetylacetonate (relaxation agent) to 0.21 g sample in a 10 mm NMR tube. The samples are dissolved and homogenized by heating the tube and its contents to 150° C. The data is collected using a Bruker 400 MHz spectrometer equipped with a Bruker Dual DUL high-temperature CryoProbe. The data is acquired using 320 transients per data file, a 7.3 sec pulse repetition delay (6 sec delay+1.3 sec acquisition time), 90 degree flip angles, and inverse gated decoupling with a sample temperature of 125° C. All measurements are made on non spinning samples in locked mode. Samples are homogenized immediately prior to insertion into the heated (130° C.) NMR Sample changer, and are allowed to thermally equilibrate in the probe for 15 minutes prior to data acquisition. Comonomer content in the crystalline block composite polymers is measurable using this technique.

Differential Scanning Calorimetry (DSC) is used to measure crystallinity in the polymers. About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)× 100 (for PE)). Unless otherwise stated, melting point(s) ($T_m$) of each polymer is determined from the second heat curve (peak Tm), and the crystallization temperature ($T_c$) is determined from the first cooling curve (peak Tc).

Calculation of Composition of Crystalline Block Composite is a summation of the weight % propylene from each component in the polymer according to equation 1 results in the overall weight % propylene and/or ethylene (of the whole polymer). This mass balance equation can be used to quantify the amount of the PP and PE present in the block copolymer, as shown below in Equation 1. This mass balance equation can also be used to quantify the amount of PP and PE in a binary blend or extended to a ternary, or n-component blend. For the crystalline block composite, the overall amount of PP or PE is contained within the blocks present in the block and the unbound PP and PE polymers.

Note that the overall weight % of propylene ($C_3$) is preferably measured from $C^{13}$ NMR or some other composition measurement that represents the total amount of $C_3$ present in the whole polymer. The weight % propylene in the PP block (wt % $C_{3PP}$) is set to 100 or if otherwise known from its DSC melting point, NMR measurement, or other composition estimate, that value can be put into its place. Similarly, the weight % propylene in the PE block (wt % $C_{3PE}$) is set to 100 or if otherwise known from its DSC melting point, NMR measurement, or other composition estimate, that value can be put into its place.

Crystalline Block Composite Index (CBCI), referring to Table 1B and Table 1C, is measured based on the method shown in Table 1C, below. In particular, CBCI provides an estimate of the quantity of block copolymer within the crystalline block composite under the assumption that the ratio of CEB to CAOB within a diblock copolymer is the same as the ratio of crystalline ethylene to crystalline alpha-olefin in the overall crystalline block composite. This assumption is valid for these statistical olefin block copolymers based on the understanding of the individual catalyst kinetics and the polymerization mechanism for the formation of the diblocks via chain shuttling catalysis as described in the specification. This CBCI analysis shows that the amount of isolated PP is less than if the polymer was a simple blend of a propylene homopolymer (in this example the CAOP) and polyethylene (in this example the CEP). Consequently, the polyethylene fraction contains an appreciable amount of propylene that would not otherwise be present if the polymer was simply a blend of polypropylene and polyethylene. To account for this "extra propylene", a mass balance calculation can be performed to estimate the CBCI from the amount of the polypropylene and polyethylene fractions and the weight percent propylene present in each of the fractions that are separated by high temperature liquid chromatography (HTLC).

TABLE 1C

| Line # | Variable | Source | CBC1 | CBC2 |
|---|---|---|---|---|
| 1 | Overall wt % C3 Total | Measured | 51.700 | 53.300 |
| 2 | wt % C3 in PP block/polymer | Measured | 99.000 | 99.000 |
| 3 | wt % C3 in PE block/polymer | Measured | 10.500 | 10.500 |
| 4 | wt fraction PP (in block or polymer) | Eq. 2 below | 0.466 | 0.484 |
| 5 | wt fraction PE (in block or polymer) | 1-Line 4 | 0.534 | 0.516 |
|  | Analysis of HTLC Separation |  |  |  |
| 6 | wt fraction isolated PP | Measured | 0.196 | 0.213 |
| 7 | wt fraction PE fraction | Measured | 0.804 | 0.787 |
| 8 | wt % C3 in PE-fraction | Eq. 4 below | 40.169 | 40.931 |
| 9 | wt fraction PP-diblock in PE fraction | Eq. 6 below | 0.335 | 0.344 |
| 10 | wt fraction PE in PE fraction | 1-Line 10 | 0.665 | 0.656 |
| 11 | wt fraction Diblock in PE fraction | 10/Line 4 | 0.720 | 0.711 |
| 12 | Crystalline Block Composite Index (CBCI) | Eq. 7 below | 0.579 | 0.560 |

Referring to Table 1C, Crystalline Block Composite Index (CBCI) is measured by first determining a summation of the weight percent propylene from each component in the polymer according to Equation 1, below, which results in the overall weight percent, as discussed above with respect to the Methods for Calculation of Composition of Crystalline Block Composite. In particular, the mass balance equation is as follows:

$$\text{Wt \% } C3_{Overall} = w_{PP}(\text{wt \% } C3_{PP}) + w_{PE}(\text{wt \% } C3_{PE}) \qquad \text{Eq. 1}$$

where $w_{PP}$=weight fraction of PP in the polymer
$w_{PE}$=weight fraction of PE in the polymer
wt % $C3_{PP}$=weight percent of propylene in PP component or block
wt % $C3_{PE}$=weight percent of propylene in PE component or block For calculating the Ratio of PP to PE in the crystalline block composite:

Based on Equation 1, the overall weight fraction of PP present in the polymer can be calculated using Equation 2 from the mass balance of the total C3 measured in the polymer. Alternatively, it could also be estimated from a mass balance of the monomer and comonomer consumption during the polymerization. Overall, this represents the amount of PP and PE present in the polymer regardless of whether it is present in the unbound components or in the diblock copolymer. For a conventional blend, the weight fraction of PP and weight fraction of PE corresponds to the individual amount of PP and PE polymer present. For the crystalline block composite, it is assumed that the ratio of the weight fraction of PP to PE also corresponds to the average block ratio between PP and PE present in this statistical block copolymer.

$$w_{PP} = \frac{\text{wt \% } C3_{Overall} - \text{wt \% } C3_{PE}}{\text{wt \% } C3_{app} - \text{wt \% } C3_{PE}} \qquad \text{Eq. 2}$$

where $w_{PP}$=weight fraction of PP present in the whole polymer wt % $C3_{PP}$=weight percent of propylene in PP component or block wt % $C3_{PE}$=weight percent of propylene in PE component or block To estimate the amount of the block in the Crystalline Block Composite, apply Equations 3 through 5, and the amount of the isolated PP that is measured by HTLC analysis is used to determine the amount of polypropylene present in the diblock copolymer. The amount isolated or separated first in the HTLC analysis represents the 'unbound PP' and its composition is representative of the PP hard block present in the diblock copolymer. By substituting the overall weight percent C3 of the whole polymer in the left hand side of Equation 3, and the weight fraction of PP (isolated from HTLC) and the weight fraction of PE (separated by HTLC) into the right hand side of equation 3, the weight percent of C3 in the PE fraction can be calculated using Equations 4 and 5. The PE fraction is described as the fraction separated from the unbound PP and contains the diblock and unbound PE. The composition of the isolated PP is assumed to be the same as the weight percent propylene in the iPP block as described previously.

$$\text{wt \% } C3_{Overall} = w_{PP\,isolated}(\text{wt \% } C3_{PP}) + w_{PE\text{-}fraction}(\text{wt \% } C3_{PE\text{-}fraction}) \quad \text{Eq. 3}$$

$$\text{wt \% } C3_{PE\text{-}fraction} = \frac{\text{wt \% } C3_{Overall} - w_{PPisolated}(\text{wt \% } C3_{PP})}{w_{PE\text{-}fraction}} \quad \text{Eq. 4}$$

$$w_{PE\text{-}fraction} = 1 - w_{PPisolated} \quad \text{Eq. 5}$$

where $w_{PPisolated}$=weight fraction of isolated PP from HTLC $w_{PE\text{-}fraction}$=weight fraction of PE separated from HTLC, containing the diblock and unbound PE wt % $C3_{PP}$=weight percent of propylene in the PP; which is also the same amount of propylene present in the PP block and in the unbound PP wt % $C3_{PE\text{-}fraction}$=weight percent of propylene in the PE-fraction that was separated by HTLC wt % $C3_{Overall}$=overall weight percent propylene in the whole polymer The amount of wt % C3 in the polyethylene fraction from HTLC represents the amount of propylene present in the block copolymer fraction that is above the amount present in the 'unbound polyethylene'. To account for the 'additional' propylene present in the polyethylene fraction, the only way to have PP present in this fraction is for the PP polymer chain to be connected to a PE polymer chain (or else it would have been isolated with the PP fraction separated by HTLC). Thus, the PP block remains adsorbed with the PE block until the PE fraction is separated.

The amount of PP present in the diblock is calculated using Equation 6.

$$w_{PP\text{-}diblock} = \frac{\text{wt \% } C3_{PE\text{-}fraction} - \text{wt \% } C3_{PE}}{\text{wt \% } C3_{PP} - \text{wt \% } C3_{PE}} \quad \text{Eq. 3}$$

Where wt % $C3_{PE\text{-}fraction}$=weight percent of propylene in the PE-fraction that was separated by HTLC (Equation 4)

wt % $C3_{PP}$=weight percent of propylene in the PP component or block (defined previously)

wt % $C3_{PE}$=weight percent of propylene in the PE component or block (defined previously)

$w_{PP\text{-}diblock}$=weight fraction of PP in the diblock separated with PE-fraction by HTLC The amount of the diblock present in this PE fraction can be estimated by assuming that the ratio of the PP block to PE block is the same as the overall ratio of PP to PE present in the whole polymer. For example, if the overall ratio of PP to PE is 1:1 in the whole polymer, then it assumed that the ratio of PP to PE in the diblock is also 1:1. Thus the weight fraction of diblock present in the PE fraction would be weight fraction of PP in the diblock ($w_{PP\text{-}diblock}$) multiplied by two. Another way to calculate this is by dividing the weight fraction of PP in the diblock ($w_{PP\text{-}diblock}$) by the weight fraction of PP in the whole polymer (Equation 2).

To further estimate the amount of diblock present in the whole polymer, the estimated amount of diblock in the PE fraction is multiplied by the weight fraction of the PE fraction measured from HTLC. To estimate the crystalline block composite index, the amount of diblock copolymer is determined by Equation 7. To estimate the CBCI, the weight fraction of diblock in the PE fraction calculated using Equation 6 is divided by the overall weight fraction of PP (as calculated in equation 2) and then multiplied by the weight fraction of the PE fraction. The value of the CBCI can range from 0 to 1, wherein 1 would be equal to 100% diblock and zero would be for a material such as a traditional blend or random copolymer.

$$CBCI = \frac{w_{PP\text{-}diblock}}{w_{PP}} \cdot w_{PP\text{-}fraction} \quad \text{Eq. 7}$$

where $w_{PP\text{-}diblock}$=weight fraction of PP in the diblock separated with the PE-fraction by HTLC (Equation 6)

$w_{PP}$=weight fraction of PP in the polymer $w_{PE\text{-}fraction}$=weight fraction of PE separated from HTLC, containing the diblock and unbound PE (Equation 5)

For example, if an iPP-PE (i.e., isotactic polypropylene block and propylene-ethylene block) polymer contains a total of 53.3 wt % C3 and is made under the conditions to produce an PE polymer with 10 wt % C3 and an iPP polymer containing 99 wt % C3, the weight fractions of PP and PE are 0.487 to 0.514, respectively (as calculated using Equation 2).

Preparation of Films

Table 2 below shows a series of multilayered films some of which are films that exemplify the invention, while others are comparative films. Comparative film samples are identified with letters (See Samples A-B and D-E), while samples that exemplify the invention are identified with numerals (See Samples 1-5). The core layer 106 comprises Inspire 114. The total film thickness is 5 mils (where 1 mil=1/1000 of an inch).

TABLE 2

| Example | Structure | (Outer layers) Layer 102/Layer 110 | (Tie layers) Layer 104/Layer 108 | (Core layers) Layer 106 | 102/104/106/108/110 for 5 layer film; 102/106/110 for 3 layer film (percentage of total thickness) |
|---|---|---|---|---|---|
| A | 3 Layer | ELITE ™ 5100 | No tie layer | INSPIRE 114 | 40/20/40 |
| B | 5 Layer | ELITE ™ 5100 | AFFINITY ™ PL1880G | INSPIRE 114 | 35/5/20/5/35 |
| 1 | 5 Layer | ELITE ™ 5100 | CBC1 | INSPIRE 114 | 35/5/20/5/35 |
| 2 | 5 Layer | ELITE ™ 5100 | 60 wt % CBC1 + 40 wt % ENGAGE ™ 8150 | INSPIRE 114 | 35/5/20/5/35 |
| 3 | 5 Layer | ELITE ™ 5100 | 60 wt % CBC1 + 20 wt % ENGAGE 8150 + 20 wt % ELITE ™ 5100 | INSPIRE 114 | 35/5/20/5/35 |
| D | 3 Layer | ELITE ™ 5100 | No tie layer | INSPIRE 114 | 37.5/25/37.5 |
| 4 | 5 Layer | ELITE ™ 5100 | CBC1 | INSPIRE 114 | 32.5/5/25/5/32.5 |
| E | 3 Layer | ELITE ™ 5100 | No tie layer | INSPIRE 114 | 35/30/35 |
| 5 | 5 Layer | ELITE ™ 5100 | CBC1 | INSPIRE 114 | 30/5/30/5/30 |

As can be seen in the Table 2, some of the comparative layers have 3 layers (Examples A, D and E). The multilayered films of the invention all have 5 layers. The layers are identified with numerals used in the FIG. 1. The outer layers are referred to by numerals 102 and 110, while the tie layers are referred to by numerals 104 and 108 and the core layer is referred to by numeral 106. Note that the core layer (Layer 106) is 20% of the total multilayer film thickness for Examples A-B and Examples 1-3, 25% for Samples D and 4, and 30% for Examples E and 5.

Examples 1-5 and comparative Examples A-B and D-E were manufactured on a LabTech 5-layer blown film line. The diameter of the extrusion die is 75 millimeters (mm) and the die gap is 2 mm. The blow-up ratio (BUR) was 2.4 to 2.5 and lay-flat width 11.4 to 11.6 inch. The nip speed was 10.5 to 12.0 ft/min. The total film thickness was 5 mils (1 mil=1/1000 of an inch). The line had 5 extruders. For 5-layer structures, extruders 1 and 5 were used for the outer layers (102 and 110), extruders 2 and 4 for tie layers (104 and 108) and extruder 3 for core layer 106. A typical extruder temperature profile is shown in Table 2A. For all the examples discussed herein, when a blend was used in a certain layer, the ingredients were typically dry-blended according to the indicated weight percentages, based on the total weight of the components used to form that certain layer, and fed to the feeder.

TABLE 2A

| Extruders | Zones | Temperature | (° F.) |
|---|---|---|---|
| Extruders 1 and 5: Outer layer | Zone 01 | Set point | 350 |
| | Zone 02 | Set point | 400 |
| | Zone 03 | Set point | 375 |
| | Zone 04 | Set point | 375 |
| | Die | Set point | 420 |
| Extruders 2 to 4: Tie layers and core layer | Zone 01 | Set point | 390 |
| | Zone 02 | Set point | 420 |
| | Zone 03 | Set point | 375 |
| | Die | Set point | 420 |

The properties of the multilayered films shown in the Table 2 are detailed in the Table 3.

TABLE 3

| Example | Dart A (g) | 1% MD Sec Mod (psi) | 2% MD Sec Mod (psi) | MD tear (g) | Heat seal failure mode |
|---|---|---|---|---|---|
| A | 832 | 58896 | 48507 | 1400 | Delamination |
| B | 836 | 60961 | 51185 | 1194 | Delamination |
| 1 | 720 | 61384 | 52051 | 2388 | No Delamination |
| 2 | 808 | 59917 | 50888 | 1588 | No Delamination |
| 3 | 764 | 54457 | 47448 | 1492 | No Delamination |
| D | 756 | 64755 | 54782 | 980 | Delamination |
| 4 | 560 | 68993 | 56651 | 1952 | No Delamination |
| E | 700 | 75032 | 61460 | 639 | Delamination |
| 5 | 532 | 76226 | 62812 | 862 | No Delamination |

From Table 3, it may be seen the inventive Examples 1-3, which have from 60 wt % to 100 wt % of crystalline block composite, show at least improved MD tear and no delamination in the heat seal test when compared with comparative Examples A-B. Similarly, compared to Example D, inventive Example 4, which has a greater thickness of the core layer, show at least enhanced MD tear and MD modulus without any delamination. Similarly, compared to Example E, inventive Example 5 show at least enhanced MD tear without any delamination.

Example 2

In this example, a different core layer 106 is used in the multilayered film as compared with the samples demonstrated in the Example 1. These samples are manufactured in a manner similar to those films of the Example 1. In this example, INSPIRE 118 is used as the core layer 106. The total film thickness is 5 mils. The compositions of the multilayered films are shown in the Table 4 and the properties are shown in the Table 5. Comparative film samples are identified with letters (See Example F), while samples that exemplify the invention are identified with numerals (See Examples 6-7).

TABLE 4

| Example | Structure | Layer 102/Layer 110 (Outer layers) | Layer 104/Layer 108 (Tie layers) | Layer 106 (core layer) | 102/104/106/108/110 for 5 layer film; 102/106/110 for 3 layer film (percentage of total thickness) |
|---|---|---|---|---|---|
| F | 3 Layer | ELITE ™ 5100 | No tie layer | INPSIRE 118 | 40/20/40 |
| 6 | 5 Layer | ELITE ™ 5100 | CBC1 | INPSIRE 118 | 35/5/20/5/35 |
| 7 | 5 Layer | ELITE ™ 5100 | CBC1 | 80 wt % INPSIRE 118 + 20 wt % ENGAGE ™ 8100 | 35/5/20/5/35 |

The properties are shown in Table 5.

TABLE 5

| Example | Dart A (g) | 1% MD Sec Mod (psi) | 2% MD Sec Mod (psi) | MD tear (g) | Heat seal failure mode |
|---|---|---|---|---|---|
| F | 404 | 80268 | 68099 | 802 | Delamination |
| 6 | 500 | 81705 | 69324 | 1921 | No Delamination |
| 7 | 680 | 72519 | 60207 | 2624 | No Delamination |

Once again, it may be seen that the comparative Example F undergoes delamination, while the inventive compositions (Examples 6 and 7) do not show any delamination. In addition, it can be seen that Examples 6 and 7 show a much higher tear strength in the machine direction.

Example 3

In this example, the composition of the tie layers 104 and 108 and the composition of the core layer 106 are changed. Table 6 shows the composition of the comparative multi-layered samples and those of the inventive samples. Table 7 shows the properties. Comparative film samples are identified with letters (See Examples G and I), while samples that exemplify the invention are identified with numerals (See Examples 8-10). These samples are produced in a similar manner to the samples of Example 1. The total film thickness is 5 mils.

The properties are shown in the Table 7.

TABLE 7

| Example | Dart A (g) | 1% MD Sec Mod (psi) | 2% MD Sec Mod (psi) | MD tear (g) | Heat seal failure mode |
|---|---|---|---|---|---|
| G | 883 | 73822 | 57381 | 1485 | Delamination |
| 8 | 967 | 70935 | 56905 | 2024 | No Delamination |
| 9 | 874 | 74780 | 58564 | 2176 | No Delamination |
| I | 1150 | 60564 | 46834 | 1404 | No Delamination |
| 10 | 1000 | 64953 | 50206 | 2238 | No Delamination |

As can be seen from the Table 7, the comparative Example G shows delamination, while comparative Examples 8-10 show no delamination. Compared to comparative Examples G, inventive Examples 8 and 9 shows significantly improved MD tear at equivalent modulus while overcoming the delamination issue observed in Example G. Inventive Example 10 demonstrates superior MD tear with excellent modulus as compared to Example I. Accordingly, while Example I did not show delamination, by adding the tie layers, MD tear was significantly improved and improvements with respect to modulus were also realized.

Example 4

In this example, the outer layers 102 and 110, the tie layers 104 and 108, and the core layer 106 all utilized different compositions from those in the Examples 1-3. The compositions are shown in the Table 8A. The layer structure for inventive Examples 11-12 are tabulated in Table 8A. The multilayer film has a total thickness of 4.25 mils.

TABLE 6

| Example | Structure | Layer 102/Layer 110 (Outer layers) | Layer 104/Layer 108 (Tie layers) | Layer 106 (core layer) | 102/104/106/108/110 for 5 layer film; 102/106/110 for 3 layer film (percentage of total thickness) |
|---|---|---|---|---|---|
| G | 3 Layer | ELITE ™ 5100 | No tie layer | PP HA802H | 40/20/40 |
| 8 | 5 Layer | ELITE ™ 5100 | 80 wt % CBC2 + 20 wt % ENGAGE ™ 8100 | PP HA802H | 35/5/20/5/35 |
| 9 | 5 Layer | ELITE ™ 5100 | 80% CBC2 + 20% VERSIFY ™ 2200 | PP HA802H | 35/5/20/5/35 |
| I | 3 Layer | ELITE ™ 5100 | No tie layer | 80 wt % PP HA802H + 20 wt % ENGAGE ™ 8100 | 40/20/40 |
| 10 | 5 Layer | ELITE ™ 5100 | CBC2 | 80 wt % PP HA802H + 20 wt % ENGAGE ™ 8100 | 35/5/20/5/35 |

TABLE 8A

| Example | Structure | Layer 102/Layer 110 (Outer layers) | Layer 104/ Layer 108 (Tie layers) | Layer 106 (core layer) | 102/104/106/108/110 (percentage of total thickness) |
|---|---|---|---|---|---|
| 11 | 5 Layer | 90 wt % ELITE ™ 5100 + 10 wt % LDPE 133A | CBC1 | 80 wt % HA802H + 20 wt % ENGAGE ™ 8100 | 35/5/20/5/35 |
| 12 | 5 Layer | 90 wt % ELITE ™ 5100 + 10 wt % LDPE 133A | CBC1 | PP H-110 | 35/5/20/5/35 |

Examples 11-12 (inventive) are prepared on an Alpine 7-layer blown film line. The diameter of the extrusion die is 200 mm and die gap is 2 mm. The die output is 12.13 lb per inch die circumference. The total throughput is 350 lb per hour. The blow-up ratio (BUR) is 1.73 and draw down ratio was 9.09. The total film thickness of 4.25 mil is made. The line has 7 extruders. Extruders 1 and 2 and extruders and 6 and 7 were used for the outer (skin) layers 102 and 110, extruders 3 and 5 were used for tie layers 104 and 109, and extruder 4 for layer 106. Typical extruder temperature profiles are shown in Table 8B.

TABLE 8B

| Extruders | Zones | Temperature | (° F.) | (° C.) |
|---|---|---|---|---|
| Extruders 1 and 2 | Zone 1 | Set point | 70 | 21 |
| Extruders 6 and 7 | Zone 2-5 | Set point | 380 | 193 |
|  | Zone 6-8 | Set point | 450 | 232 |
| Extruders 3 and 5 | Zone 1 | Set point | 70 | 21 |
|  | Zone 2-5 | Set point | 380 | 193 |
|  | Zone 6-7 | Set point | 450 | 232 |
| Extruder 4 | Zone 1 | Set point | 70 | 21 |
|  | Zone 2-5 | Set point | 380 | 193 |
|  | Zone 6-8 | Set point | 450 | 232 |
| Die |  | Set point | 450 | 232 |

The properties are shown in the Table 9.

TABLE 9

| Example | Dart A (g) | 1% MD Sec Mod (psi) | 2% MD Sec Mod (psi) | MD tear (g) | CD Tensile Break Stress (psi) | CD Strain at Break (%) | CD Stress at Yield (psi) | MD Tensile Break Stress (psi) | MD Strain at Break (%) | MD Stress at Yield (psi) |
|---|---|---|---|---|---|---|---|---|---|---|
| 11 | 706 | 75571 | 59611 | 1611 | 5753 | 632 | 2385 | 6100 | 544 | 2491 |
| 12 | 610 | 78392 | 65113 | 1393 | 5543 | 645 | 2663 | 6057 | 561 | 2700 |

From the Table 9, it may be seen that samples having a polypropylene core layer show a high 2% secant modulus (e.g., greater than 59000 psi) and high MD tear (e.g., greater than 1300 g) when the total film thickness is as low as 4.25 mils.

In summary, it may be seen that the use of a core layer that contains polypropylene and the use of tie layers that comprise a crystalline block composite (e.g., from 55 wt % to 100 wt %) to bond the core layer to the outer layers performs significantly better than multilayer films that do not have tie layers that comprise a crystalline block composite. crystalline block composite. For example, the inventive examples show no delamination in the heat seal failure test and display a machine direction tear of 850 to 2500 grams, specifically 1000 to 2300 grams when tested as per ASTM D 1922, and display a 2% machine direction modulus greater than 47000 psi, specifically greater than 50000 psi, when tested as per ASTM D 882. The multilayered film may be used to produce articles. The articles include bags and pouches for packaging and transporting commercial goods, foods, grains, and the like.

What is claimed is:

1. A method comprising:
coextruding a multilayered film comprising:
two outer layers; where each outer layer comprises polyethylene;
two tie layers; where each tie layer comprises 50 weight percent to 100 weight percent of a crystalline block composite; where each tie layer has a first face and a second face that are opposed to each other, where the first face of each tie layer contacts at least one outer layer; and where the crystalline block composite comprises a crystalline ethylene based polymer, a crystalline alpha-olefin based polymer, and a block copolymer comprising a crystalline ethylene block and a crystalline alpha-olefin block, wherein the crystalline ethylene block of the block copolymer is the same composition as the crystalline ethylene based polymer in the block composite and the crystalline alpha-olefin block of the block copolymer is the same composition as the crystalline alpha-olefin based polymer of the block composite; and
a core layer; where the core layer comprises a polypropylene; where the second face of each tie layer contacts the core layer; and
blowing the multilayered film.

2. The method of claim 1, further comprising laminating the film in a roll mill.

3. The method of claim 1, where the polyethylene comprises a linear low density polyethylene or an ethylene-α-olefin copolymer.

4. The method of claim 3, where the linear low density polyethylene in each outer layer has a melt index $I_2$ of 0.25 to 2.5 g/10 minutes when measured as per ASTM D 1238 at 190° C. and 2.16 kg.

5. The method of claim 3, where the ethylene-α-olefin copolymer is ethylene/propylene, ethylene/butene, ethylene/1-hexene, ethylene/1-octene, ethylene/styrene, ethylene/propylene/1-octene, ethylene/propylene/butene, ethylene/butene/1-octene, ethylene/butene/styrene, or a combination comprising at least one of the foregoing ethylene-α-olefin copolymers.

6. The method of claim 4, where the outer layer further comprises low density polyethylene and/or high density polyethylene.

7. The method of claim 5, where the outer layer further comprises low density polyethylene and/or high density polyethylene.

8. The method of claim 1, where each tie layer further comprises an elastomer; and where the elastomer is a homogeneously branched ethylene-α-olefin copolymer, a polyolefin elastomer, a vinyl aromatic block copolymer, or a combination comprising at least one of the foregoing elastomers.

9. The method of claim 8, where each tie layer further comprises polypropylene and/or polyethylene.

10. The method of claim 1, where the polypropylene is selected from the groups consisting of random copolymer polypropylene, impact copolymer polypropylene, high impact polypropylene, high melt strength polypropylene, isotactic polypropylene, syndiotactic polypropylene, or a combination comprising at least one of the foregoing polypropylenes.

11. The method of claim 10, where the core layer further comprises polyethylene or an elastomer; and where the elastomer is a homogeneously branched ethylene-α-olefin copolymer, a polyolefin elastomer, a vinyl aromatic block copolymer, or a combination comprising at least one of the foregoing elastomers.

12. The method of claim 1, where the crystalline block composite has a melt flow ratio 0.1 to 30 dg/min, when measured as per ASTM D 1238 at 230° C. and 2.16 kilograms.

13. The method of claim 1, where the crystalline block composite comprises 5 to 95 weight percent crystalline ethylene blocks and 95 to 5 wt percent crystalline alpha-olefin blocks.

* * * * *